United States Patent
Singla et al.

(10) Patent No.: US 11,165,663 B2
(45) Date of Patent: Nov. 2, 2021

(54) NETWORK MANAGEMENT USING A DISTRIBUTED LEDGER

(71) Applicant: HEWLETT PACKARD ENTERPRISE DEVELOPMENT LP, Houston, TX (US)

(72) Inventors: Nitin Singla, Bangalore (IN); Yashavantha Nagaraju Naguvanahalli, Bangalore (IN); Sunil Jayadevappa, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/657,627

(22) Filed: Oct. 18, 2019

(65) Prior Publication Data

US 2021/0119886 A1 Apr. 22, 2021

(51) Int. Cl.
*H04L 12/24* (2006.01)
*H04L 29/12* (2006.01)
*H04L 9/06* (2006.01)
*G06F 16/903* (2019.01)

(52) U.S. Cl.
CPC ............ *H04L 41/50* (2013.01); *G06F 16/903* (2019.01); *H04L 9/0643* (2013.01); *H04L 61/2007* (2013.01); *H04L 61/6022* (2013.01); *H04L 2209/38* (2013.01)

(58) Field of Classification Search
CPC ... H04L 41/50; H04L 61/2007; H04L 9/0643; H04L 61/6022; H04L 2209/38; G06F 16/903
See application file for complete search history.

(56) References Cited

U.S. PATENT DOCUMENTS

| | | | |
|---|---|---|---|
| 10,200,474 B2 | 2/2019 | Zhang et al. | |
| 2017/0272342 A1* | 9/2017 | Zessin | H04L 41/12 |
| 2018/0018723 A1 | 1/2018 | Nagla et al. | |
| 2018/0268401 A1 | 9/2018 | Ortiz et al. | |
| 2018/0343175 A1* | 11/2018 | Bathen | H04L 67/10 |
| 2019/0394113 A1* | 12/2019 | Huang | H04L 9/0643 |
| 2020/0186607 A1* | 6/2020 | Murphy | H04L 67/1097 |

FOREIGN PATENT DOCUMENTS

CN 108683539 A 10/2018

OTHER PUBLICATIONS

Holger Kinkelin et al., "Trustworthy Configuration Management for Networked Devices Using Distributed Ledgers," May 8, 2018, pp. 1-5, IEEE.

(Continued)

*Primary Examiner* — Philip C Lee
(74) *Attorney, Agent, or Firm* — Hewlett Packard Enterprise Patent Department

(57) ABSTRACT

Examples include systems and methods for managing a network for example, an enterprise network using a distributed ledger. Some examples include maintaining a distributed ledger by a plurality of NMS units in the network. Use of such distributed ledger may allow communication among NMS units of the plurality of NMS units deployed in the network through the distributed ledger.

20 Claims, 4 Drawing Sheets

(56) References Cited

OTHER PUBLICATIONS

Zak Cole, "How Blockchain Technology Could Affect the Future of Network Engineering," Nov. 9, 2017, pp. 1-4, Network World, Retrieved from the Internet on Apr. 24, 2019 at URL: <networkworld.com/article/3236479/how-blockchain-technology-could-affect-the-future-of-network-engineering.html>.

CoinDesk, "What is Blockchain Technology", available online at <https://www.coindesk.com/learn/blockchain-101/what-is-blockchain-technology>, 2017, 26 pages.

Mani Kumar Reddy, "Optical Network Management", available online at <https://manikumarreddy.com/2010/10/05/optical-network-management/>, Oct. 5, 2010, 2 pages.

Margaret Rouse, "Network Management System", available online at <https://web.archive.org/web/20191012081951/https://searchnetworking.techtarget.com/definition/network-management-system>, Oct. 12, 2019, 4 pages.

Nagpal et al., "A Study of Distributed Network Management Architectures", International Journal of Innovative Research in Computer and Communication Engineering, vol. 3, No. 4, Apr. 2015, pp. 3238-3246.

Pulak Piplani, "The role of the network management system in virtualized networks", Nokia, available online at <https://www.nokia.com/blog/role-network-management-system-virtualized-networks/>, Sep. 11, 2017, 9 pages.

Wikipedia, "Blockchain", available online at <https://en.wikipedia.org/w/index.php?title=Blockchain&oldid=919429635>, Oct. 3, 2019, 18 pages.

\* cited by examiner

NETWORK MANAGEMENT USING A DISTRIBUTED LEDGER

BACKGROUND

A network management system (NMS) may be employed in a network to manage and organize several managed devices. For example, an NMS may identify, configure, update, monitor and troubleshoot several managed devices in an enterprise network and provide system-level management. Multiple NMSs may exist for managing a large network such as cloud. Each NMS may request and receive information from the underlying managed devices, and present the information to a network administrator, which may control and organize the configuration of the managed devices and overall network.

BRIEF DESCRIPTION OF THE DRAWINGS

The following detailed description references the drawings, wherein.

DETAILED DESCRIPTION

Figure 1:
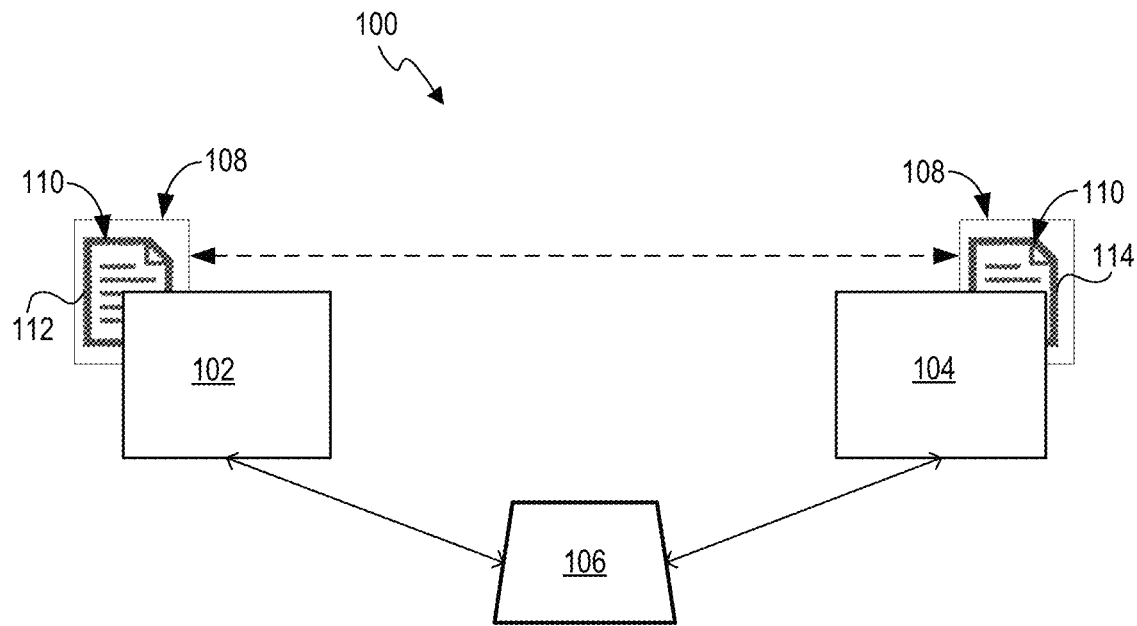
FIG. 1 is a schematic block diagram of an example network including a plurality of NMS units and a managed device.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two as or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise.

As discussed, to provide proper functioning and management in a network for example, an enterprise network, an NMS unit may ensure whether the managed devices, and links forming the network are operating efficiently. An NMS unit may refer to a network management system (NMS) that is an application used to identify, manage, configure, monitor and troubleshoot various devices (i.e., managed device) on the network at an instant of time. An NMS unit may ensure that the managed devices are identified and configured correctly. The NMS unit may collect and provide information (that may be referred to as networking information) about activity of the managed devices such as device upgrades, bandwidth usage, memory utilization, system utilization etc. and service availability in the network. These information may help in identifying network trends and assist in resource allocation for organizing and managing the network.

Moreover, collecting and organizing networking information by an NMS unit may involve performing a networking operation (e.g., polling) for retrieving networking information of the managed devices. Networking operation may refer to an operation or an action performed by an NMS unit to retrieve desired networking information of a managed device at a given time. The NMS unit may poll the managed device at predetermined periodic intervals, which may involve sending a query (i.e., querying or requesting) to the managed device and receiving a response to the query from the managed device to retrieve networking information of the managed device and send any desired configuration changes to the managed device. In some examples, the NMS unit may send a query to the managed device for retrieving networking information of the managed device or another managed device coupled to the managed device. Such another managed device may be referred to as a connected device. In such examples, the NMS unit may receive a response including networking information (e.g., desired networking information) of the managed device or a connected device.

As used herein, the term "networking information" refers to information about activity and service availability of a managed device that may be retrieved from the managed device and used for the management of a network. In an example, the networking information may include device information of the managed device, for example, type of device, MAC address of the device, IP address of the device, and the like. In some examples, the networking information of the managed device may include basic information about the managed devices such as memory utilization, system utilization, number of other managed devices (i.e., connected devices) coupled to the managed device, types of connected devices, allocation of managed devices, configuration of polling of NMS units with the managed devices, or Simple Network Management Protocol (SNMP) and RESTful API information. Furthermore, the networking information may include specific information about the managed device, for example, passwords for login in to RADIUS server, authentication server etc., various access policies, security profiles for the network, user(s) information and the like. Networking information, as described in various examples throughout the specification, may include networking information at a given time i.e., instantaneous networking information.

With increasing bandwidth requirements, networks are expanding continuously. For large scale networks, for example, networks including hundreds or thousands of nodes, network management may become more and more difficult due to complexity and size of the network. Furthermore, a variety of different issues may be encountered while managing large networks. For example, polling of the managed devices, upgrading the NMS units, testing and validation of new updates, network traffic and latency, and security, may become excessive and extremely complex. In an example, a managed device may be polled by multiple NMS units simultaneously and perform same operations multiple times in response to the requests from multiple NMS units. Such excessive polling of the managed devices by multiple NMS units may result in high utilization of Central Processing Unit (CPU) and memory of the managed devices. In some examples, managing multiple NMSs and polling with multiple managed devices may run into conflicts among the managed devices and result in defects or failure in performing operations. Moreover, such complex architecture may be difficult to maintain and also prohibitive for new services.

Examples described herein provide systems and simple methods for managing a network, for example, an enterprise network using a distributed ledger. In examples described herein, the systems may involve a distributed ledger maintained by a plurality of NMS units in the network. Such a distributed ledger in described systems and methods may allow communication among various NMS units deployed in the network through the distributed ledger, which may result in proper functioning and management of the network. Accordingly, the described systems and methods provide a highly secure, steady and efficient system for managing the network.

A distributed ledger, that may also be referred to as a shared ledger or distributed ledger technology (DLT), is a consensus of replicated, shared and synchronized digital ledger spread across multiple nodes. An example of distributed ledger may be a blockchain, which can be public or private digital ledger for maintaining records of a sequence of executed events (e.g., transactions or actions) in datablocks, which are linked cryptographically. A "datablock" may be a unit of data recordation for a distributed ledger. Each datablock may contain information indicating the corresponding event and a signature (for example, a cryptographic hash) of a respective prior datablock, linking the two datablocks. This way, datablocks may be chained together by including the signature of a corresponding prior datablock in every new datablock of the distributed ledger. Such chaining of datablocks may confirm the integrity of a datablock and make it difficult to alter the datablock in the distributed ledger without such alteration being readily detectable. In some examples, a distributed ledger may be implemented by a distributed ledger management system (for example, a blockchain system), which may comprise a plurality of computing devices to implement the distributed ledger management system. In an example, a distributed ledger may be a form of a decentralized database that may be stored at one or more nodes (e.g., participating entities or blockchain nodes) such as respective computing device, which may be participating in the distributed ledger management system. In such examples, each node participating in the distributed ledger management system may get a copy of the distributed ledger, which may be downloaded automatically upon enrolling for the distributed ledger management system. At least some participating entities may maintain the distributed ledger and cryptographically validate each new datablock added to the distributed ledger, and the event(s) represented in the corresponding datablock. The distributed ledger management system may create a datablock in the distributed ledger to record information corresponding an executed event. The distributed ledger management system may also record information identifying the participating entities and information identifying an owner of each datablock. An owner of a datablock may be a participating entity that provides data to create a respective datablock in the distributed ledger.

The term "signature", as used herein, refers to an identifier for a datablock in a distributed ledger. In an example, the signature may be a digital signature, for example, an alphanumeric string that may be generated for a content of a datablock in a distributed ledger. In some examples of the present subject matter, the signature may be a cryptographic hash generated at the creation of a datablock in the distributed ledger.

In a distributed ledger management system, a series of datablocks may be created, in a distributed ledger, to record information related to the executed events. In an example, a datablock may be created to record information corresponding to an event at a given time. In examples described herein, a given datablock may include information identifying an action performed while performing a networking operation at a given time. For example, a datablock may comprise information identifying an operation performed, by an NMS unit, to retrieve networking information of a managed device. In such examples, a datablock may comprise information identifying networking information of the managed device at a given time. In another example, a datablock may be created corresponding a change in networking information of a managed device in predetermined periodic intervals. Such changed networking information in predetermined periodic intervals may be referred to as updated networking information of a managed device. Further, new datablocks may be created that corresponding to updated networking information or additional events in relation to retrieved networking information, at a given time, of the managed device. Each new datablock may also include a signature of a respective prior datablock. Prior datablock may refer to a datablock, corresponding to a managed device, in the distributed ledger that is created just before the creation of a new datablock corresponding to the managed device such that no intervening datablock exists between the new datablock and the corresponding prior datablock. In this manner, a new datablock (for example, a created datablock) and the corresponding prior datablock may be "chained" together to form a series of datablocks in the distributed ledger for the managed device. In such examples, each additional datablock may create additional security for the validity of the entire distributed ledger. This makes it difficult to retroactively alter data stored within the distributed ledger without that alteration being detected.

Further, a distributed ledger management system may be implemented as a public or a private distributed ledger. In a private distributed ledger, the access to the distributed ledger may be restricted for securing its privacy. For example, in such implementations, the participating entities of the distributed ledger management system may be assigned with certain protocols and permissions to access the distributed ledger. For example, some participating entities may have only read permissions while other participating entities may have read and write permissions. Some participating entities, for example, may access data pertaining only to them via public-private key encryption. In such an example, data on the private distributed ledger may be relevant to a given participating entity that may be encrypted using a blockchain public key such that only a blockchain private key can decrypt its contents.

In examples of the present subject matter, a plurality of NMS units in a network may maintain a distributed ledger in a distributed ledger management system. Maintaining a distributed ledger may mean performing various functions on or through the distributed ledger, for example, creating datablocks, determining information recorded in the distributed ledger or retrieving information from the distributed ledger. Each NMS unit of the plurality of NMS units may be a participating entity of the distributed ledger management system, and may access the distributed ledger and maintain a copy of the distributed ledger. In an example, each NMS unit may record information identifying an action performed while performing a networking operation in its copy of the distributed ledger, which information may be replicated to other copies of the distributed ledger. As a result, each NMS unit may maintain identical copies of the distributed ledger. The recorded information in the distributed ledger may be displayed by an NMS unit through its copy of the distributed ledger for the management of the network at a given time. In an example, a managed device (e.g., a switch) may be a participating entity of the distributed ledger and may record updated networking information in the distributed ledger in predetermined periodic intervals.

In examples described herein, the distributed ledger may record multiple events that occurred or were performed in relation to networking information of managed devices, for example, networking operations performed by an NMS unit of the plurality of NMS units during polling, a change that occurred in networking information of a managed device in predetermined periodic intervals and the like. For example, the distributed ledger may record various information such as allocation of managed devices, a networking operation performed by an NMS unit, updated networking information of the managed devices, or networking information retrieved by an NMS unit while performing a networking operation. Such information may be shared with each NMS unit of the plurality NMS units through the distributed ledger and displayed through the distributed ledger for end use purposes such as management of the network. Hence, such sharing of information among NMS units of the plurality of NMS units in the network may reduce the number of networking operations performed by NMS units of the plurality of NMS units and eliminate conflicts and issues among NMS units of the plurality of NMS units and the managed devices. Thus, the systems and methods, as described herein, may result in reducing CPU utilization, reducing memory utilization, efficient utilization of bandwidth, and proper functioning and management of the network. In addition, such systems and methods may provide redundancy in case of failure of an NMS unit in the plurality of NMS units as any other NMS unit may perform the networking operations and retrieve networking information of the managed devices. Moreover, the described systems and methods may provide a highly secure, steady and efficient network.

The systems and methods of the present subject matter are further described with reference to FIGS. 1-5. It should be noted that the description and figures merely illustrate the principles of the present subject matter along with examples described herein and, should not be construed as a limitation to the present subject matter. It is thus understood that various arrangements may be devised that, although not explicitly described or shown herein, embody the principles of the present subject matter. Moreover, all statements herein reciting principles, aspects, and embodiments of the present subject matter, as well as specific examples thereof, are intended to encompass equivalents thereof Although the one or more portions of the description herein are with reference to one managed device of the system, the methods and described techniques may be utilized for several managed devices. Furthermore, many process and functions performed by a distributed ledger management system, as described herein, may be performed by one or more components of the distributed ledger management system. Various implementations of the present subject matter have been described below by referring to several examples.

FIG. 1 schematically depicts an example network 100. The network 100 includes a first NMS unit 102, a second NMS unit 104 and a managed device 106 coupled (i.e., communicatively coupled) with the first and second NMS units (102, 104). The first and second NMS units (102, 104) may collect and organize networking information of the managed device 106 for proper functioning and management of the network 100. The managed device 106 may be an active element in the network 100, that is capable of receiving instructions and provide instantaneous information and returning responses to queries from one or more of the first NMS unit 102 or the second NMS unit 104, in the network 100. In some other examples, various managed devices in a network may present a consolidated view of various managed devices that can be accessed and monitored in the network. Non-limiting examples of the managed device 106 may include a computer host, a server, a router, a printer, a bridge, an access point, a hub, a switch, or combinations thereof.

In some examples, an NMS unit (e.g., the first NMS unit 102 or the second NMS unit 104) may send a query to the managed device 106 for retrieving networking information of the managed device 106 or another managed device (i.e., a connected managed device) coupled to the managed device. In such examples, the NMS unit may receive a response, from the managed device 106, including networking information (e.g., desired networking information) of the managed device 106 or the managed connected device. In examples described herein throughout the specification, performing a network operation by an NMS unit to a managed device may include performing the network operation for retrieving networking information of the managed device or a connected managed device. For example, sending a query to managed device may include sending a query to the managed device for retrieving networking information of the managed device or the connected managed device, and receiving a response to the query may include receiving a response from the managed device such that the response may include networking information of the managed device or the connected managed device.

Each NMS unit, for example, the first NMS unit 102 and the second NMS unit 104, may be a computing device (for example a computer, a device including a processor or microcontroller and/or any other electronic component) or a device or system that performs one or more operation according to one or more programming instructions. Examples of the computing device may include, but are not limited to, a desktop computer, a laptop, a smartphone, a server, a computer appliance, a workstation, a storage system, or a converged or hyperconverged system, and the like.

The managed device 106 may be in communication with various components of the network 100, for example, the first and second NMS units (102, 104), through a wired or wireless network. In examples described herein, the network 100 may include, for example, a local area network (LAN), a virtual LAN (VLAN), a wireless local area network (WLAN), a virtual private network (VPN), the Internet, or the like. In an example, the network 100 includes a Simple Network Management Protocol (SNMP) managed network. Communication over the network 108 may be performed in accordance with various communication protocols such as, but not limited to, Transmission Control Protocol and Internet Protocol (TCP/IP), User Datagram Protocol (UDP), IEEE 802.11n, and cellular communication protocols over the communication links 110. The communication links 110 may be enabled via wired (e.g., Ethernet, optical communication, etc.) or wireless (e.g., Wi-Fi®, cellular communication, satellite communication, etc.) communication technologies.

In examples as described herein, the first NMS unit 102 and the second NMS unit 104 may maintain a distributed ledger 110 implemented by a distributed ledger management system 108 in the network 100. In an example, the distributed ledger 110 may be updated and maintained according to various functionalities of the distributed ledger management system 108. In an example, the distributed ledger 110 may be implemented as a private distributed ledger, which may be accessed by the participating entities (i.e., the first NMS unit 102 and the second NMS unit 104), of the distributed ledger management system 108, in accordance with certain protocols and permissions of the distributed ledger management system 108 to access the distributed ledger 110. As noted, the first NMS unit 102 and the second NMS unit 104 may be participating entities of the distributed ledger management system 108. A copy of the distributed ledger 110 may be available to each participating entity of the distributed ledger 110. As illustrated in FIG. 1, the first NMS unit 102 may have a first copy 112 of the distributed ledger 110 and the second NMS unit 104 may have a second copy 114 of the distributed ledger 110.

In an example, the distributed ledger 110 may be maintained by the first NMS unit 102 and the second NMS unit 104 to record an event occurred or performed in relation to networking information of the managed device 106, for example, a networking operation performed by the first NMS unit 102 or the second NMS unit 104 and a change occurred in networking information of a managed device 106 at a given time. A networking operation may be performed by the first NMS unit 102 or the second NMS unit 104 to retrieve networking information of one or more of the managed device 106. In such examples, the first NMS unit 102 or the second NMS unit 104 may send instructions to the distributed ledger management system 108 to create a respective datablock in the distributed ledger 110 for each action performed by the first NMS unit 102 or the second NMS unit 104 while performing the networking operation. This way, the networking operations performed by the first NMS unit 102, the second NMS unit 104 or both may be recorded in the distributed ledger 110. During operation, the first NMS unit 102 may record a networking operation performed by the first NMS unit 102 in its first copy 112 of distributed ledger 110, and the second NMS unit 104 may record a networking operation performed by the second NMS unit 104 in its second copy 114 of the distributed ledger 110. The respective recorded information in the first copy 112 and the second copy 114 may be replicated between the first copy 112 and the second copy 114 of the distributed ledger 110. As a result, each participating entity i.e., the first NMS unit 102 and the second NMS unit 104 may maintain identical copy of the distributed ledger 110.

In an example, the first NMS unit 102 or the second NMS unit 104 may determine whether networking information of the managed device 106 is recorded in the distributed ledger 110. In an example, the first NMS unit 102 or the second NMS unit 104 may determine whether networking information of the managed device is recorded corresponding to a predefined time duration. In some examples, in response to determining that the networking information of the managed device 106 is recorded in the distributed ledger 110, the first NMS unit 102 or the second NMS unit 104 may update the recorded networking information with a timestamp in the distributed ledger 110. For example, the first NMS unit 102 or the second NMS unit 104 may retrieve the recorded networking information from the distributed ledger 110 and send instructions to the distributed ledger management system 108 to create a datablock in the distributed ledger 110 to include the recorded networking information with a timestamp. In such example, the created datablock may comprise the recorded networking information with a timestamp and a signature of a corresponding prior datablock.

In some examples, in response to determining that the networking information of the managed device 106 is not recorded in the distributed ledger 110, the first NMS unit 102 or the second NMS unit 104 may perform a networking operation. Further, the first NMS unit 102 or the second NMS unit 104 may send instruction to the distributed ledger management system 108 to create a respective datablock in the distributed ledger 110 for an action performed while performing the networking operation. In such examples, each created datablock may comprise information identifying the action performed by performing the networking operation and a signature of a respective prior datablock. For example, a created datablock may include a query sent from the first NMS unit 102 or the second NMS unit to the managed device 106. Further, another datablock may include a response (that includes networking information of the managed device 106) to the query received by the first NMS unit 102 or the second NMS unit 104 from the managed device 106.

Furthermore, in some examples, each datablock may include one or more of MAC address or IP address of the managed device 106 or a connected managed device. The one or more of MAC address or IP address may help in identifying a managed device for which a networking operation may be performed, and network information may be retrieved or networking information may be recorded with a timestamp. In some examples, the networking operation may be performed that includes retrieving and collecting networking information of a connected managed device. In such example, the respective datablock created in the distributed ledger 110 may include one or more of MAC address or IP address of the connected managed device.

In some examples, each created datablock of the distributed ledger 110 may include a signature of a respective prior datablock that may be created at the time of creation of the respective prior datablock. Furthermore, in some examples, each created datablock may include a timestamp of a creation of the datablock. This way, timestamp of the entry of the networking operation and networking information may be recorded in the distributed ledger 110. This may help in determining the time of recording the networking information and identify whether the networking information recorded in the distributed ledger 110 is valid networking information (described below).

In some examples, the information identifying the networking operation recorded in a datablock of the distributed ledger 110 may be unencrypted, encrypted or hashed. In an example, the information recorded (unencrypted data) in a datablock may be unencrypted and accessed and read by each participating entity of the distributed ledger 110. In an example, the information recorded (encrypted data) in a datablock may be encrypted. In such example, the encrypted data may be accessible and read by each participating entity with a decryption key. In such examples, the decryption key provides access to the encrypted data in the datablock and also provides information indicating the participating entity that recorded the information in the datablock and time of recordation of the information in the datablock. In some examples, the information recorded (hashed data) in a datablock may be hashed. Such hashed data may ensure that the information recorded in the datablock is not tampered with.

In some examples, the managed device 106 may be a participating entity of the distributed ledger 110 and may record one or more pieces of networking information, for example, updated networking information in the distributed ledger 110 in predetermined periodic intervals. An example of such managed device may be a switch. In such example, the switch may send instructions to the distributed ledger management system 108, in predetermined periodic intervals, to create a datablock in its copy of the distributed ledger 110 to record the updated networking information of the switch or a connected managed device to the switch. That is, the switch may record the updated networking information in the distributed ledger 110 in predetermined periodic intervals. In an example, the one or more pieces of networking information, which may be updated in predetermined periodic intervals, may be selected while defining the rules or instructions on the managed device 106 or the first and second NMS units 102 and 104. In an example, the one or more pieces of networking information that may be updated by a switch, in the distributed ledger 110, may include device information of a managed device, memory utilization of a managed device, CPU utilization of a managed device, forwarding path for a managed device, or details of connected managed devices of a managed device.

In an example, the participating entities (i.e., the first NMS unit 102 and the second NMS unit 104) of the distributed ledger 110 may recognize and approve a node (e.g., a device in the network 100) to access the distributed ledger 110. For example, the first NMS unit 102 and second NMS units 104 may recognize a device that may not be a participating entity of the distributed ledger 110. In such examples, the first NMS unit 102 and second NMS units 104 may restrict the device to access the distributed ledger 110. In some examples, the device may be added as a participating entity of the distributed ledger 110 based on consensuses from existing participating entities.

Figure 2:
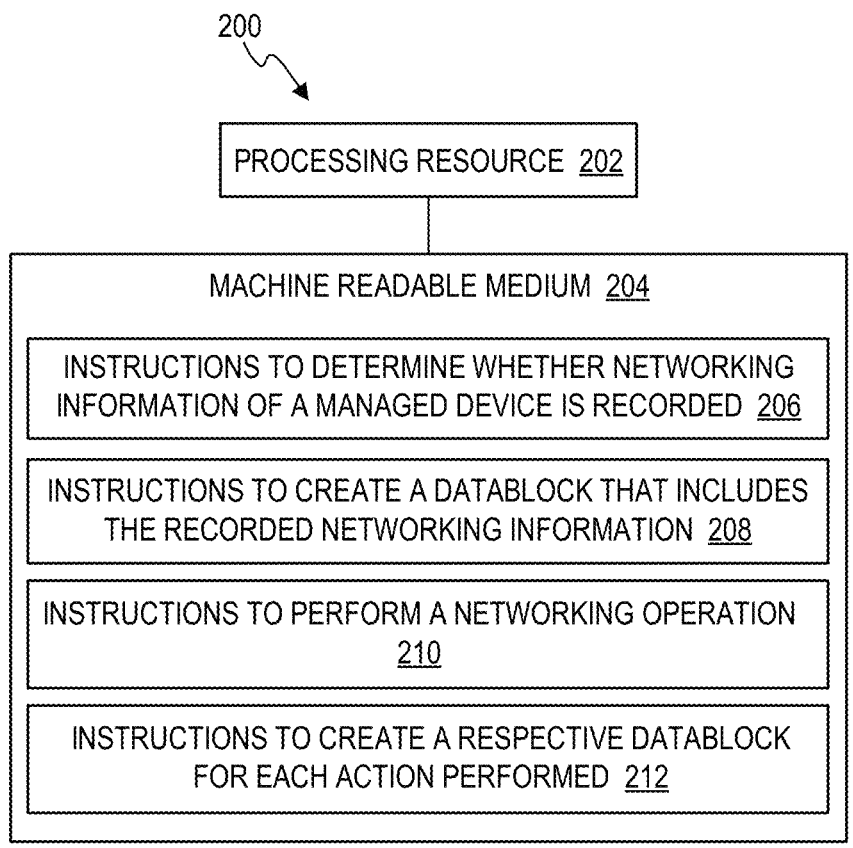
FIG. 2 is a block diagram of an example NMS unit to maintain a distributed ledger in a network.

FIG. 2 is a block diagram 200 depicting a processing resource 202 and a machine readable medium 204 encoded with example instructions to maintain the distributed ledger 110, in accordance with an example. The machine readable medium 204 is non-transitory and is alternatively referred to as a non-transitory machine readable medium 204. In some examples, the machine readable medium 204 may be accessed by the processing resource 202. The processing resource 202 and the machine readable medium 204 may be included in NMS units, such as the first NMS unit 102 and the second NMS unit 104.

Figure 3:
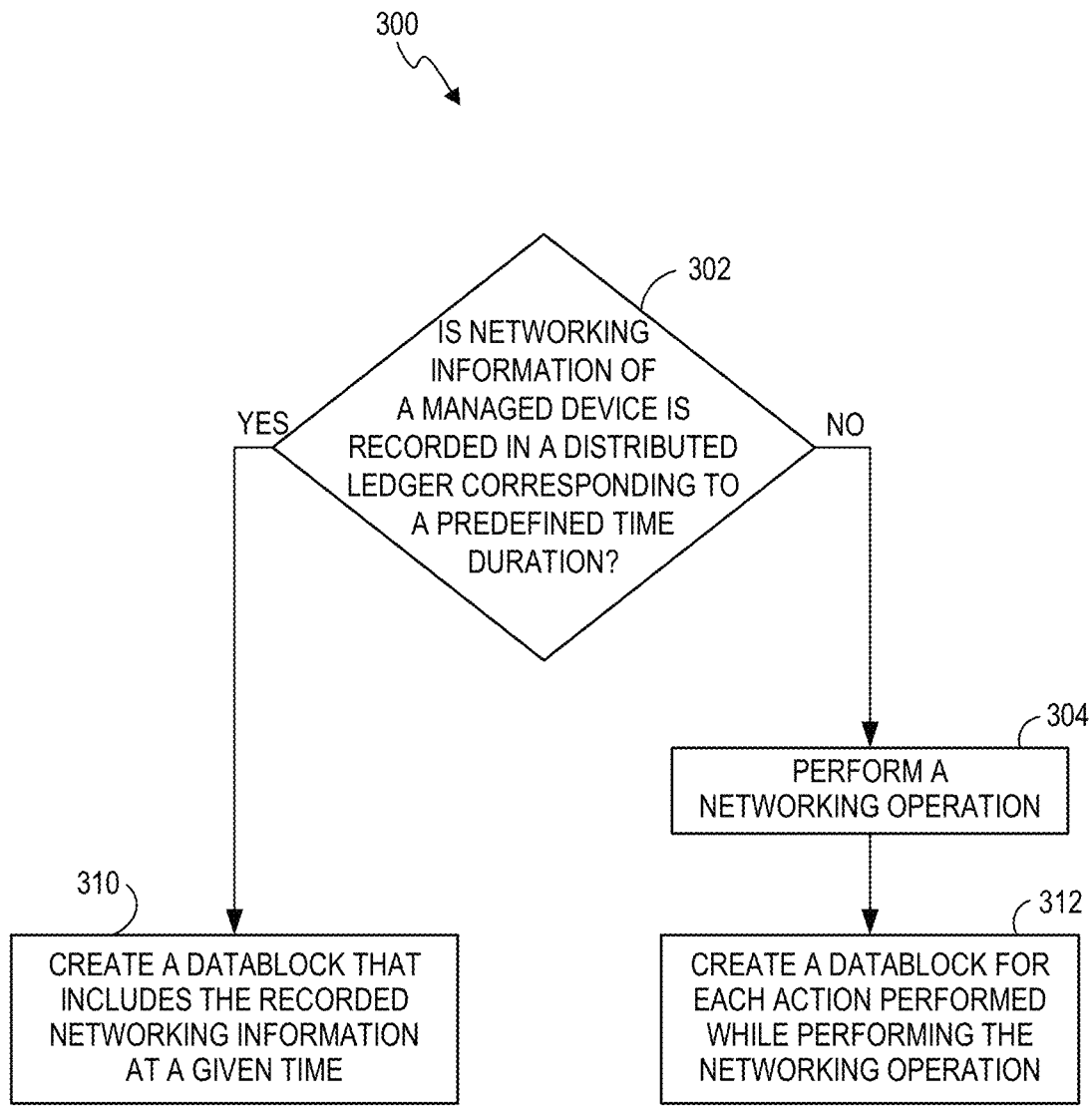
FIG. 3 is a flowchart of an example method for maintaining a distributed ledger by an NMS unit in a network.
Figure 4:
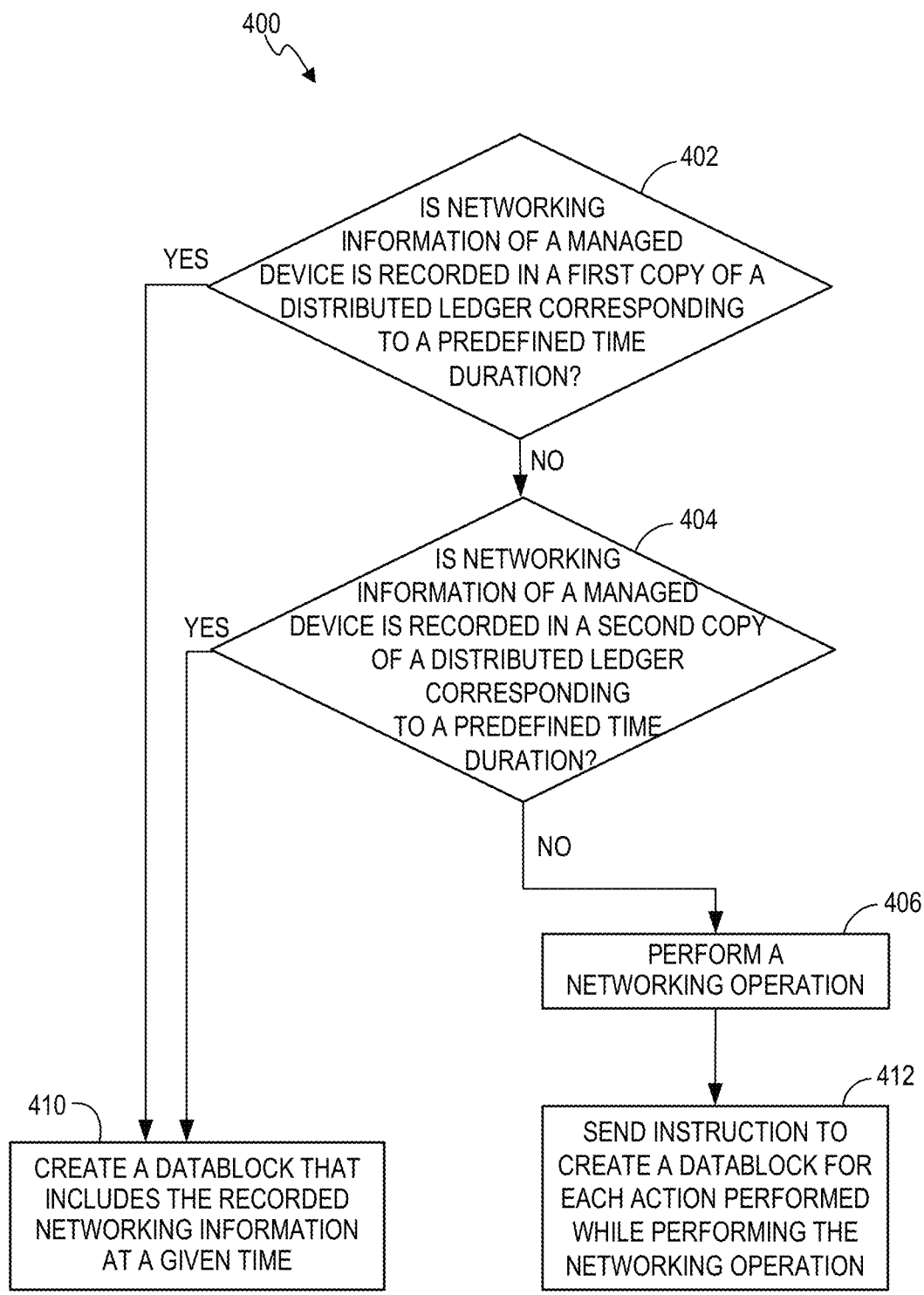
FIG. 4 is a flowchart of another example method for maintaining a distributed ledger by an NMS unit in a network.
Figure 5:
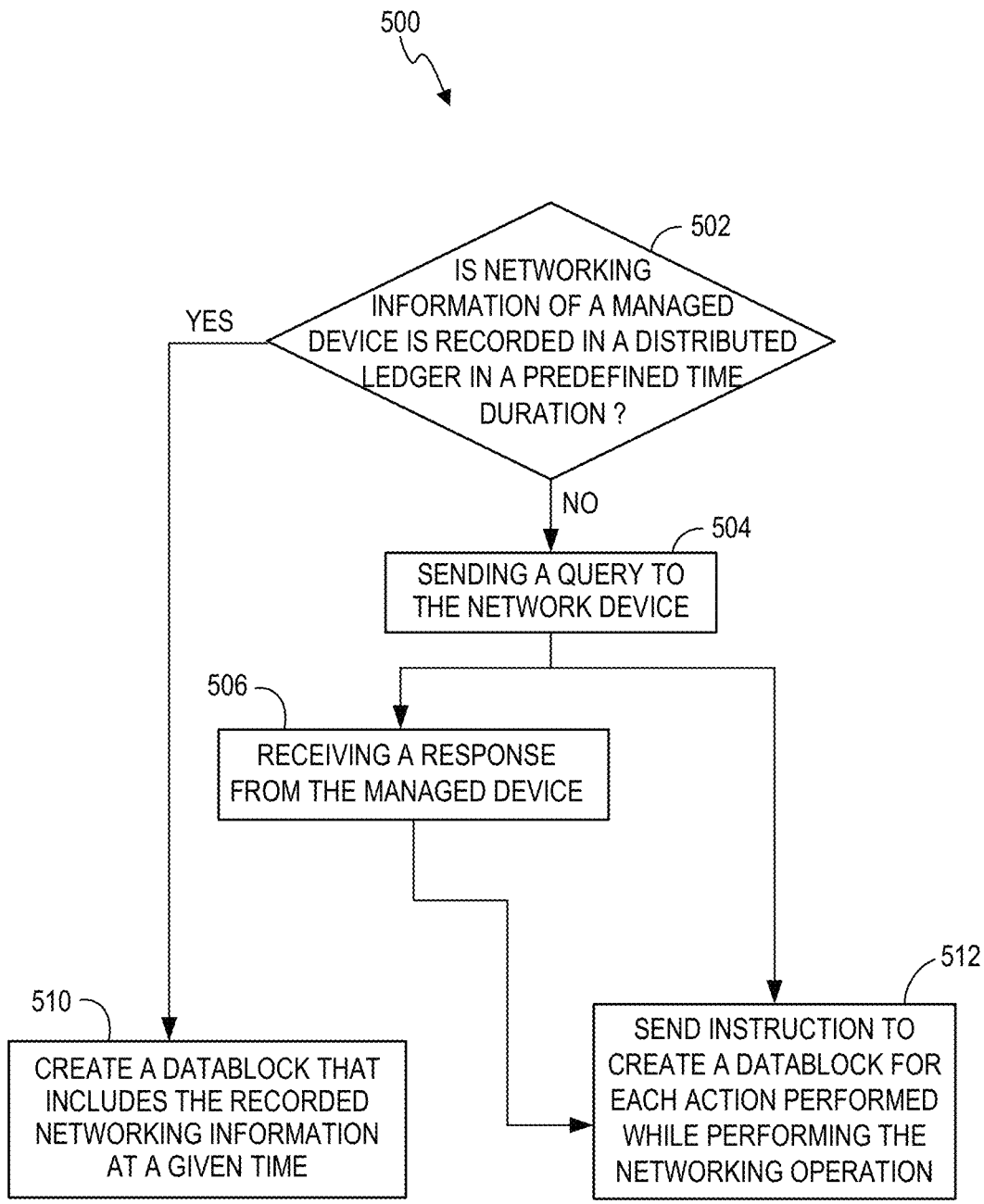
FIG. 5 is a flowchart of yet another method for maintaining a distributed ledger by an NMS unit in a network.

The machine readable medium 204 may be encoded with example instructions 206, 208, 210, and 212. The instructions 206, 208, 210, and 212 of FIG. 2, when executed by the processing resource 202, may implement various aspects of maintaining a distributed ledger. In particular, the instructions 206, 208, 210, and 212 of FIG. 2 may be useful for performing the functionalities of the first NMS unit 102 or the second NMS unit 104 and the methods described below with respect to FIGS. 3-5. Although instructions 206, 208, 210, and 212 of FIG. 2, when executed by the processing resource 202, may perform the functionalities of the first NMS unit 102 or the second NMS unit 104, for the sake of simplicity, the below description of FIG. 2 and the methods of FIGS. 3-5 are described with respect to the first NMS unit 102.

Non-limiting examples of the processing resource 202 may include a microcontroller, a microprocessor, central processing unit core(s), an application-specific integrated circuit (ASIC), a field programmable gate array (FPGA), etc. The machine readable medium 204 may be a non-transitory storage medium, examples of which include, but are not limited to, a random access memory (RAM), a read-only memory (ROM), an electrically erasable programmable read-only memory (EEPROM), a flash memory, a hard disk drive, etc. The processing resource 202 may execute instructions (i.e., programming or software code) stored on the machine readable medium 204. Additionally or alternatively, the processing resource 202 may include electronic circuitry for performing the functionality described herein.

The instruction 206, when executed by a processing resource such as processing resource 202, may cause the first NMS unit 102 to determine whether networking information of the managed device 106 is recorded, in the distributed ledger 110, corresponding to a predefined time duration. The process of determination is described below in detail with reference to FIG. 4. In some instances, the networking information may have been recorded, in the distributed ledger 110, within the predefined time duration from a given time i.e., a time of determining the recorded networking information. In some examples, the instruction 206 may further include instruction, when executed by a processing resource such as processing resource 202, may cause the first NMS unit 102 to check that the networking information might have been recorded within the time duration from a given time. In these instances, the recorded networking information may be deemed valid networking information. In such examples, the first NMS unit 102 may record the networking information with a timestamp in the distributed ledger 110. In such examples, the created datablock may comprise the recorded networking information with a timestamp and a signature of a corresponding prior datablock.

In examples described herein, networking information recorded in the distributed ledger 110 may or may not be deemed valid networking information. Valid networking information may mean that the recorded networking information may be considered or used for the management of the network at a given time. In an instance, networking information that may be recorded in the distributed ledger 110 prior to a predefined time duration from a given time (i.e., at a time of determining the recorded networking information) may not be deemed valid networking information. In another instance, networking information that may be recorded within the predefined time duration from a given time (i.e., at a time of determining the recorded networking information) may be deemed valid networking information.

In some examples, in response to determining that the networking information of the managed device 106 is recorded, the instruction 208 when executed by the processing resource 200 may cause the first NMS unit 102 to send instruction to the distributed ledger management system 108 to create, in the distributed ledger 110, a datablock that may include the recorded networking information with a timestamp and a signature of the corresponding prior datablock. This way, the distributed ledger 110 may be updated with the recorded networking information with a timestamp.

In some examples, in response to determining that the networking information of the managed device 106 is not recorded, the instruction 210 when executed by the processing resource 200 may cause the first NMS unit 102 to perform a networking operation. In such examples, the instruction 210 may cause the first NMS unit 102 to send a query to the managed device 106 and receive a response to the query from the managed device 106. In an example, the response to the query includes networking information (i.e., desired networking information) of the managed device 106 at a given time. Further, the instruction 212 when executed by the processing resource 200, may cause the first NMS unit 102 to send instructions to the distributed ledger management system 108 to create, in the distributed ledger 110, a datablock for each action performed by the first NMS unit 102 while performing the networking operation. For example, the instruction 212 may cause the first NMS unit 102 to send instructions to the distributed ledger management system 108 to create, in the distributed ledger 110, a datablock corresponding to sending a query to the managed device 106 and another datablock corresponding to receiving a response to the query from the managed device 106. In said example, another datablock includes networking information of the managed device 106 at a given time. The instructions 206-212 may include various instructions to execute at least a part of the methods described in FIGS. 3-5 (described later). Also, although not shown in FIG. 2, the machine readable medium 204 may also include additional program instructions to perform various other method blocks described in FIGS. 3-5.

FIGS. 3-5 depict flowcharts of respective example methods 300, 400, 500 for maintaining the distributed ledger 110 by the first NMS unit 102, in accordance with various examples. In some other examples, the methods 300, 400, 500 may be performed by the second NMS unit 104. For ease of illustration, the execution of methods 300, 400, 500 are described in details below with reference to FIG. 1. Although the below description is described with reference to the first NMS unit 102 of FIG. 2, however other computing devices suitable for the execution of methods 300, 400, 500 may be utilized. Additionally, implementation of methods 300, 400, 500 is not limited to such examples. Although the flowcharts of FIGS. 3-5, individually, show a specific order of performance of certain functionalities, methods 300, 400, 500 are not limited to such order. For example, the functionalities shown in succession in the flowcharts may be performed in a different order, may be executed concurrently or with partial concurrence, or a combination thereof.

As described in various examples presented herein, creating a datablock in a copy of a distributed ledger may mean that an NMS unit or a managed device may send instruction to a distributed ledger management system 108 to create a datablock (i.e., a new datablock). For example, the first NMS unit 102 may send instruction to the distributed ledger management system 108 to create a datablock, in a first copy 112 of the distributed ledger 110, for an action performed while performing a networking operation by the first NMS unit 102. Furthermore, any action of creating a datablock in the distributed ledger 110 by an NMS unit, for example, the first NMS unit 102, may mean that the datablock is created in the first copy 112 of the distributed ledger 110, which may be replicated to the second copy 114 of the distributed ledger 110 according to the functionalities of the distributed ledger management system 108.

At 302, the method 300 may include determining whether networking information of the managed device 106 is recorded in the distributed ledger 110 corresponding to a predefined time duration. In an example, the first NMS unit 102 may determine whether the networking information of the managed device 106 is recorded in the distributed ledger 110 within the predefine time duration from a given time. Networking information that may be recorded in the distributed ledger 110 prior to the predefined time duration from a given time may not be deemed valid networking information and thus may not be considered for managing the network. The process for determining whether the networking information of the managed device 106 is recorded in the distributed ledger 110 corresponding to the predefined time duration is described with respect to method 400 of FIG. 4.

Referring to FIG. 4 now, the method 400 may be described in conjunction with the method 300 of FIG. 3. The method block 302 of the method 300 may be performed in two method blocks 402 and 404 of the method 400, in some examples. At method block 402, the method 400 may include determining whether the networking information of the managed device 106 is recorded in the first copy 112 of the distributed ledger 110 (that is available to the first NMS unit 102). In such instances, the first NMS unit 102 may access the first copy 112 of the distributed ledger 110 and determine whether the networking information of the managed device 106 is recorded in the first copy 112 corresponding to the predefined time duration.

In some instances, the recorded networking information may be deemed valid networking information as the networking information might have been recorded in the first copy 112 within the predefined time duration from a given time ("YES" at method block 402). In such instances, the first NMS unit 102 may retrieve the recorded networking information from the first copy 112 of the distributed ledger 110 to record it in the distributed ledger 110 with a timestamp (i.e., updating the distributed ledger 110 with the recorded networking information with a time stamp). Accordingly, in response to determining that networking information of the managed device 106 is recorded in the distributed ledger 110 ("YES" at method block 402), the method 400, at method block 410, may include sending instructions, by the first NMS unit 102, to the distributed ledger management system 108 to create a datablock in the first copy 112 of the distributed ledger 110, that includes the recorded networking information with a timestamp. Such networking information may be available at and displayed by the first NMS unit 102 through the first copy 112 of the distributed ledger 110, which may be useful for controlling and organizing the network 100. Referring to FIG. 3, the method block 310 is analogous to the method block 410 of the method 400 in FIG. 4.

Referring again to the method block 402 of the method 400, in some other instances, the networking information of the managed device 106 may be recorded in the first copy 112 of the distributed ledger 110 prior to the predefined time duration. In such instances, the networking information in the first copy 112 of the distributed ledger 110 may not be deemed valid networking information. In some instances, the networking information of the managed device 106 may not be recorded in the first copy 112 of the distributed ledger 110. In such instances when the networking information of the managed device 106 may not be deemed valid networking information or not recorded in the first copy 112 ("NO" at method block 402), the method 400, at method block 404, may include determining whether the networking information of the managed device 106 is recorded in the second copy 114 of the distributed ledger 110, corresponding to the predefined time duration.

In some examples, the networking information of the managed device 106 may be recorded in the second copy 114 of the distributed ledger 110, by the second NMS unit 104 within the predefined time duration from a given time. In some instances, the first NMS unit 102 may retrieve the networking information from the first copy 112 of the distributed ledger 110 after information of the second copy 114 of the distributed ledger 104 is replicated to the first copy 112 of the distributed ledger 110. The networking information may be retrieved to record (i.e., update) the networking information in the first copy 112 of the distributed ledger 110 with a timestamp. Accordingly, in response to determining that networking information of the managed device 106 is recorded in the distributed ledger 110 ("YES" at method block 404), the method 400, at method block 410, may include sending instructions, by the first NMS unit 102, to the distributed ledger management system 108 to create a datablock in the first copy 112 of the distributed ledger 110, where that created datablock includes recorded networking information at a given time. Such networking information may be available at and displayed by the first NMS unit 102 through the first copy 112 of the distributed ledger 110, which may be useful for controlling and organizing the network 100. The method block 310 of the method 300 in FIG. 3 is analogous to the method block 410 of the method 400 in FIG. 4.

In some examples, the two method blocks 402 and 404 of the method 400 in FIG. 4 for determining whether the networking information of the managed device 106 is recorded in the distributed ledger 110, may occur sequentially or simultaneously. In some examples, the method block 302 for determining and the method block 310 for sending instruction to create a datablock may occur sequentially or simultaneously. In FIG. 4, is some examples, the method blocks 402 and 404 for determining and the method block 410 for sending instruction to create a datablock may occur sequentially or simultaneously.

Referring to the method block 404 of the method 400, in some other instances, the networking information of the managed device 106 may be recorded in the second copy 114 of the distributed ledger 110 prior to the predefined time duration. In such instances, the networking information in the second copy 114 of the distributed ledger 110 may not be deemed valid networking information. In some instances, the networking information of the managed device 106 may not be recorded in the second copy 112 of the distributed ledger 110. That is, in some examples, the networking information of the managed device 106 may not be deemed valid networking information or not recorded in the second copy 112. In such instances, in response to determining that the networking information of the managed device is not recorded in the distributed ledger 110 ("NO" at method block 302 of FIG. 3 or method block 404 of FIG. 4), the first NMS unit 102 may receive consensus from the second NMS unit 104 to perform a networking operation.

Referring to FIG. 3, in some examples, in response to determining (at method block 302) that networking information of the managed device 106 is not recorded in the distributed ledger 110 ("NO" at method block 302 of FIG. 3), the method 300, at 304, may include performing a networking operation. Referring to FIG. 4, the method block 406 is analogous to the method block 304 of the method 300 in FIG. 3. In an example, at method block 312, the method 300 may include sending instructions to create a respective datablock in the distributed ledger 110 for each action performed by the first NMS unit 102 while performing the networking operation. In such instances, the first NMS unit 102 may send instructions to the distributed ledger management system 108 to create a respective datablock in the first copy 112 of the distributed ledger 110 for each action performed by the first NMS unit 102 while performing the networking operation. In an example, the created datablock may include information identifying the action performed by the first NMS unit 102 while performing the networking operation and a signature of the respective prior datablock. In some examples, after the creation of the respective method block(s), the information included in the first copy 112 may further be replicated to the second copy 114 of the distributed ledger 110 as per functionalities of the distributed ledger management system 108. Such information that is included in the respective created datablock(s) may be available at and displayed by the first NMS unit 102 through the first copy 112 of the distributed ledger 110 for controlling and organizing the network 100. Referring to FIG. 4, the method block 412 is analogous to the method block 312 of the method 300 in FIG. 3. In some examples, the method block 304 for performing a networking operation and the method block 312 for sending instruction to create a respective datablock may occur sequentially or simultaneously. In FIG. 4, in some examples, the method block 406 for performing a networking operation and the method block 412 for sending instruction to create a respective datablock may occur sequentially or simultaneously.

Referring to FIGS. 3 and 4, the method 300 and the method 400, individually, may be performed in an ongoing manner to look at iterations made in the distributed ledger 110. The iterations made in the distributed ledger 110 may refer to the creation of new datablock(s) for updating the recorded networking information by the first NMS unit 102 or for each action performed by the first NMS unit 102 while performing the networking operation. In some other examples, the iteration made in the distributed ledger 110 may also refer to the creation of new datablock(s) corresponding a change in one or more pieces of networking information of the managed device or another managed device coupled to the managed device in predetermined periodic intervals. In examples described with respect to FIGS. 3 and 4, every time, prior to performing a networking operation (method block 304 in FIG. 3 and method block 406 in FIG. 4), the first NMS unit 102 may determine whether the networking information of the managed device 106 is recorded in the distributed ledger 110.

FIG. 5 depicts a flowchart for maintaining a distributed ledger, such as the distributed ledger 110, in some examples. The method blocks 502 and 510 may be analogous, respectively, to method blocks 302 and 310 of FIG. 3. Also, the method block 502 may be analogous to the method blocks 402 and 404 of FIG. 4, and the method block 510 may be analogous to the method blocks 410 of FIG. 4. The method blocks 504 and 506 may described the process of performing a network operation of the method block 304 of FIG. 3 or the method block 406 of FIG. 4, in some examples. At the method block 504, the method 500 may include sending a query to the managed device 106. In such instances, the first NMS unit 102 may send a query to the managed device 106 to retrieve networking information of the managed device 106. In some examples, at the method block 512, the method 500 may include sending instructions to create a datablock for the action of sending a query to the managed device 106 performed by the first NMS unit 102. In such instances, the first NMS unit 102 may send instruction to the distributed ledger management system 108 to create the datablock in the first copy 112 of the distributed ledger 110. In these examples, the created datablock may include information identifying the query sent by the first NMS unit 102 to the managed device 106 and a signature of the prior block corresponding to the managed device 106 in the distributed ledger 110. In some examples, the method block 504 for sending a query and the method block 512 for sending instruction may occur or be performed sequentially or simultaneously.

In some examples, at the method block 506, the method 500 may include receiving a response to the query from the managed device 106. In such examples, the first NMS unit 102 may receive the response from the managed device 106. The response to the query from the managed device 106 may include networking information of the managed device 106 in response to the query sent to the managed device 106. For example, the first NMS 102 may send a query about a status of memory use of the managed device 106 and receive a response including information indicating the status of the memory use of the managed device 106. In some examples, the response may include the networking information of the managed device 106 at a given time (i.e., the instantaneous networking information). The method 500, at the method block 512, may further include sending instruction to create a datablock, in the distributed ledger 110, corresponding to the action of receiving the response to the query from the managed device 106. In such examples, the first NMS unit 102 may send instruction to the distributed ledger management system 108 to create the datablock in the first copy 112 of the distributed ledger 110. In these examples, the created datablock may include information identifying the response from the managed device and a signature of the prior block (e.g., the datablock including the query) corresponding to the managed device 106. In an example, the created datablock includes information identifying the networking information of the managed device 106 at a given time. Such networking information may be available at and displayed by the first NMS unit 102 through the first copy 112 of the distributed ledger 110, which may be used for controlling and organizing the network 100. Further, information included in the first copy 112 may be replicated to the second copy 114 of the distributed ledger 110 according to the functionality of the distributed ledger management system 108. In some examples, the method block 506 for receiving a response and the method block 512 for sending instruction to create a datablock may occur or be performed sequentially or simultaneously.

As discussed above, a datablock is created in the first copy 112 of the distributed ledger 110 by the first NMS unit 102, for an action performed by the NMS unit 102 or record updated networking information of a managed device at a given time. In some examples, information in the first copy 112 may be replicated to the second copy 114 of the distributed ledger 110 every time a datablock is created in the first copy 112 of the distributed ledger 110. In some examples, a datablock may be created in the second copy 114 of the distributed ledger 110 by the second NMS unit 104. In such examples, information in the second copy 114 may be replicated to the first copy 112 of the distributed ledger 110 every time a datablock is created in the second copy 114 of the distributed ledger 110. This way, the first NMS unit 102 and the second NMS unit 104 may communicate networking information of the managed device 106 retrieved respectively by the first NMS unit 102 and the second NMS unit 104 to each other via the distributed ledger 110. Information identifying the networking information in the first copy 112, in the second copy 114 of the distributed ledger 110 or both may be available at and displayed respectively by the first copy 112, the second copy 114 of the distributed ledger 110 or both, which may be useful for end use purposes, such as controlling and organizing the network 100.

The method 500 may be performed in an ongoing manner to look at iterations made in the distributed ledger 110. The iterations made in the distributed ledger 110 may refer to the creation of new datablock(s) for updating the recorded networking information by the first NMS unit 102 or for each action performed by the first NMS unit 102 while performing the networking operation. In examples described with respect to FIG. 5, every time, prior to sending a query to the managed device 106 (method block 504), the first NMS unit 102 may determine whether the networking information of the managed device 106 is recorded in the distributed ledger 110.

Based on the discussion above, information in a copy of a distributed ledger may be replicated to other copies of the distributed ledger (available with several participating entities of the distributed ledger) every time a datablock is created in a copy of the distributed ledger. As a result, various instantaneous networking information of various managed devices in a network may be included in the distributed ledger time to time in an ongoing manner. These instantaneous networking information may be available at and displayed from the distributed ledger by one or more NMS units in the network, which may be useful for controlling and organizing the network. Such system of NMS units maintaining a distributed ledger may help in reducing polling, which leads to reduction in CPU utilization, reduction in memory utilization, efficient utilization of bandwidth, and enhancing overall efficiency of the operation.

As used herein, a "computing device" may be a server, storage system, storage array, desktop or laptop computer, switch, router, or any other processing device or equipment including a processing resource. In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. In examples described herein, a processing resource may fetch, decode, and execute instructions stored on a storage medium to perform the functionalities described in relation to the instructions stored on the storage medium. In other examples, the functionalities described in relation to any instructions described herein may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the examples illustrated in FIGS. 1 and 2, the first NMS unit 102 and the second NMS unit 104 may each be implemented by one machine-readable storage medium, or multiple machine-readable storage media.

What is claimed is:
1. A method, comprising:
   determining, by a first network management system (NMS) unit of a plurality of NMS units, a timestamp corresponding with a data entry in a distributed ledger at a managed device;

comparing, by the first NMS unit of the plurality of NMS units, the timestamp with a predetermined time duration;

when the timestamp is outside of the predetermined time duration, determining that networking information is not recorded in the distributed ledger;

in response to determining that the networking information is not recorded in the distributed ledger, sending by the first NMS unit, a query to another NMS unit or the managed device to retrieve the networking information; and sending instruction, by the first NMS unit, to a distributed ledger management system to create at least one datablock in the distributed ledger for an action comprising the sending of the query to the another NMS unit or managed device, performed by the first NMS unit, wherein the at least one datablock comprises information identifying the action performed, a respective timestamp, and a signature of a respective prior datablock.

2. The method of claim 1, wherein the at least one datablock comprises a media access control (MAC) address or an Internet Protocol (IP) address of the managed device.

3. The method of claim 1, wherein determining comprises determining the networking information of the managed device from the distributed ledger recorded by one of the first NMS unit and a second NMS unit of a plurality of NMS units.

4. The method of claim 1, further comprising, in response to determining that the networking information of the managed device is recorded in the distributed ledger, sending instruction to the distributed ledger management system to create, in the distributed ledger, a datablock that comprises the recorded networking information with a timestamp and a signature of a corresponding prior datablock.

5. The method of claim 1, wherein the action performed comprises sending a query to the managed device.

6. The method of claim 5, wherein the action performed comprises receiving a response to the query respectively from the managed device.

7. The method of claim 1, wherein the information identifying the action performed may be unencrypted, encrypted or hashed.

8. The method of claim 1, wherein the managed device comprises a server, a switch, a controller, a computer host, a router, a printer, a bridge, an access point, a hub or combinations thereof.

9. The method of claim 1, further comprising sending instruction, by the managed device, to the distributed ledger management system to create a datablock, in the distributed ledger, corresponding a change in networking information of the managed device or another managed device coupled to the managed device in predetermined periodic intervals.

10. A non-transitory machine-readable storage medium comprising instructions executable by a processing resource, to:
  determine a timestamp corresponding with a data entry in a distributed ledger at a managed device;
  compare the timestamp with a predetermined time duration;
  when the timestamp is outside of the predetermined time duration, determine that networking information is not recorded in the distributed ledger;
  in response to determining that the networking information of the managed device is not recorded in the distributed ledger, send by the first NMS unit, a query to another NMS unit or the managed device to retrieve the networking information; and
  send instruction to the distributed ledger management system to create, in the distributed ledger, at least one datablock for an action comprising the sending of the query to the another NMS unit or the managed device, wherein the at least one datablock comprises information identifying the action performed, a respective timestamp, and a signature of a respective prior datablock.

11. The non-transitory machine-readable storage medium of claim 10, wherein the at least one datablock comprises a MAC address or an IP address of the managed device.

12. The non-transitory machine-readable storage medium of claim 10, wherein the instruction to determine comprises instruction to determine the networking information of the managed device from the distributed ledger recorded by one of a first NMS unit and a second NMS unit of a plurality of NMS units.

13. The non-transitory machine-readable storage medium of claim 10, wherein the action performed comprises instruction to send a query to the managed device.

14. The non-transitory machine-readable storage medium of claim 13, wherein the action performed comprise instruction to receive a response to the query from the managed device.

15. The non-transitory machine-readable storage medium of claim 10, wherein the information identifying the action performed may be unencrypted, encrypted or hashed.

16. The non-transitory machine-readable storage medium of claim 10, wherein the managed device comprises a server, a switch, a controller, a computer host, a router, a printer, a bridge, an access point, a hub or combinations thereof.

17. A system comprising:
  a plurality of network management system (NMS) units maintaining a distributed ledger, wherein each NMS unit of the plurality of NMS units comprises:
  a processing resource; and
  a non-transitory machine-readable storage medium comprising instructions executable by the processing resource to:
    determine a timestamp corresponding with a data entry in the distributed ledger;
    compare the timestamp with a predetermined time duration;
    when the timestamp is outside of the predetermined time duration, determine that networking information is not recorded in the distributed ledger;
    in response to determining that the networking information of the managed device is not recorded in the distributed ledger, send by the first NMS unit, a query to another NMS unit or the managed device to retrieve the networking information; and
    send instruction to a distributed ledger management system to create, in the distributed ledger, at least one datablock for an action comprising the sending of the query to the another NMS unit or the managed device, wherein the at least one datablock comprises information identifying the action performed, a respective timestamp, and a signature of a respective prior datablock.

18. The system of claim 17, wherein each NMS unit of the plurality of NMS units is coupled to the managed device.

19. The system of claim 17, wherein the instructions comprise instructions executable by the processing resource to:

in response to determining that networking information of the managed device is recorded in the distributed ledger, send a second instruction to the distributed ledger management system to create a datablock in the distributed ledger, wherein the created datablock comprises the recorded networking information with a timestamp and a signature of a corresponding prior datablock.

20. The system of claim 17, wherein the instruction to determine comprises instruction to determine the networking information of the managed device from the distributed ledger recorded by one of a first NMS unit and a second NMS unit of the plurality of NMS units.

* * * * *